United States Patent
Stafford

(10) Patent No.: US 7,796,578 B2
(45) Date of Patent: Sep. 14, 2010

(54) RESOLUTION OF IP ADDRESSES ASSOCIATED WITH A TELEPHONE NUMBER UTILIZING QUERY FLAGS

(75) Inventor: Matthew Wayne Stafford, Austin, TX (US)

(73) Assignee: Cingular Wireless II, LLC, Atlanta, GA (US)

( * ) Notice: Subject to any disclaimer, the term of this patent is extended or adjusted under 35 U.S.C. 154(b) by 1380 days.

(21) Appl. No.: 11/243,217

(22) Filed: Oct. 4, 2005

(65) Prior Publication Data

US 2007/0116250 A1  May 24, 2007

(51) Int. Cl.
*H04L 12/28* (2006.01)

(52) U.S. Cl. .............. 370/351; 379/220.01; 379/88.17; 709/203; 370/392

(58) Field of Classification Search ................. 370/352, 370/351; 379/88.17, 220.01; 709/203
See application file for complete search history.

(56) References Cited

U.S. PATENT DOCUMENTS

| | | | |
|---|---|---|---|
| 2002/0027915 A1 | 3/2002 | Foti et al. | 370/392 |
| 2003/0007482 A1 | 1/2003 | Khello et al. | 370/352 |
| 2003/0055954 A1 | 3/2003 | Kavanagh | 709/224 |
| 2006/0072575 A1 * | 4/2006 | Miyajima et al. | 370/392 |

OTHER PUBLICATIONS

Berners-Lee, T. et al., Uniform Resource Identifiers (URI): Generic Syntax, *Standards Track*, Aug. 1998, 40 pages.
Faltstrom, P., "E.164 Number and DNS", Cisco Systems, Inc, *Standards Track*, Sep. 2000, 10 pages.
Mealling, M. et al., "The Naming Authority Pointer (NAPTR) DNS Resource Record", *Standards Track*, Sep. 2000, 18 pages.
Mealling, M., "Dynamic Delegation Discovery System (DDDS) Part Three: the Domain Name System (DNS) Database", Oct. 2002, 11 pages.
Moy, J. et al., "Graceful OSPF Restart", *Standards Track*, Nov. 2003, 18 pages.

* cited by examiner

*Primary Examiner*—Ahmad F Matar
*Assistant Examiner*—Antim Shah
(74) *Attorney, Agent, or Firm*—Woodcock Washburn LLP

(57) ABSTRACT

Queries for IP addresses associated with a telephone number are conducted in accordance with query flags contained with an ENUM record. A query flag indicates the type of query to be initiated against the DNS databases. The query flag provides a means for interpreting the domain name portion of the URI contained in the ENUM record. Query flags provide an explicit indication as to the type of query to be performed against the DNS and provide an explicit indication as to how the domain name portion of a URI in an ENUM record should be interpreted. Query flags also provide guidance pertaining to subsequent actions to be performed. The use of query flags eliminates ambiguities associated with making assumptions about the domain name contained in an ENUM record. Thus, the use of query flags can reduce latency, reduce the load on transmission links, and reduce processing load on network elements.

13 Claims, 6 Drawing Sheets

| Order | Preference | Query Flag | Services | Regular Expression |
|---|---|---|---|---|
| - - | - - | "g" | "E2U+sip" | "!^.*$!sip:+15123725623@ims.carrier-B.com!" |

| Order | Preference | Query Flag | Services | Regular Expression |
|---|---|---|---|---|
| - - | - - | "m" | "E2U+mms:mailto" | "!^.*$!mailto:+15123725623@mms.carrier-B.com!" |

FIGURE 3

RESOLUTION OF IP ADDRESSES ASSOCIATED WITH A TELEPHONE NUMBER UTILIZING QUERY FLAGS

TECHNICAL FIELD

The technical field generally relates to communications systems and more specifically to Electronic Numbering (ENUM).

BACKGROUND

Electronic Numbering (ENUM) refers to technology used to merge the telephone system with the Internet. Utilizing ENUM, a telephone number can be used to route communications over the Internet and a single telephone number can be associated with multiple services, such as email or multimedia messaging, for example. ENUM provides a crucial first step in the process of mapping a telephone number to an Internet Protocol (IP) address, or addresses. Once an ENUM record is obtained, a domain name is extracted and one or more subsequent queries is performed to obtain an IP address. However, no specific procedure is in place to determine exactly how to interpret the domain name. If an incorrect interpretation is made, system latency suffers and outcomes may be unpredictable. Therefore, in the presence of such ambiguity, the most pragmatic approach may be to pursue a signaling flow that applies to the most general situation, but is inefficient. The additional queries in such a flow can result in increased system latency, increased load on transmission links, and increased processing load on network elements.

SUMMARY

An ENUM record used to obtain an IP address associated with a telephone number comprises at least one query flag. A query flag indicates the type of query to be initiated against the DNS databases. A query flag is incorporated into the ENUM record when an ENUM server is provisioned. The query flag provides a means for interpreting the domain name portion of the URI within an ENUM record. In an exemplary embodiment, a query flag value of "g" indicates that a DNS query for server resource records should be initiated, and a query flag value of "m" indicates that a DNS query for mail exchange resource records should be initiated.

BRIEF DESCRIPTION OF THE DRAWINGS

The foregoing and other objects, aspects and advantages will be better understood from the following detailed description with reference to the drawings, in which:

FIG. 3 is an illustration of portions of ENUM records showing exemplary ENUM flags "g" and "m";

DETAILED DESCRIPTION OF ILLUSTRATIVE EMBODIMENTS

Figure 1:
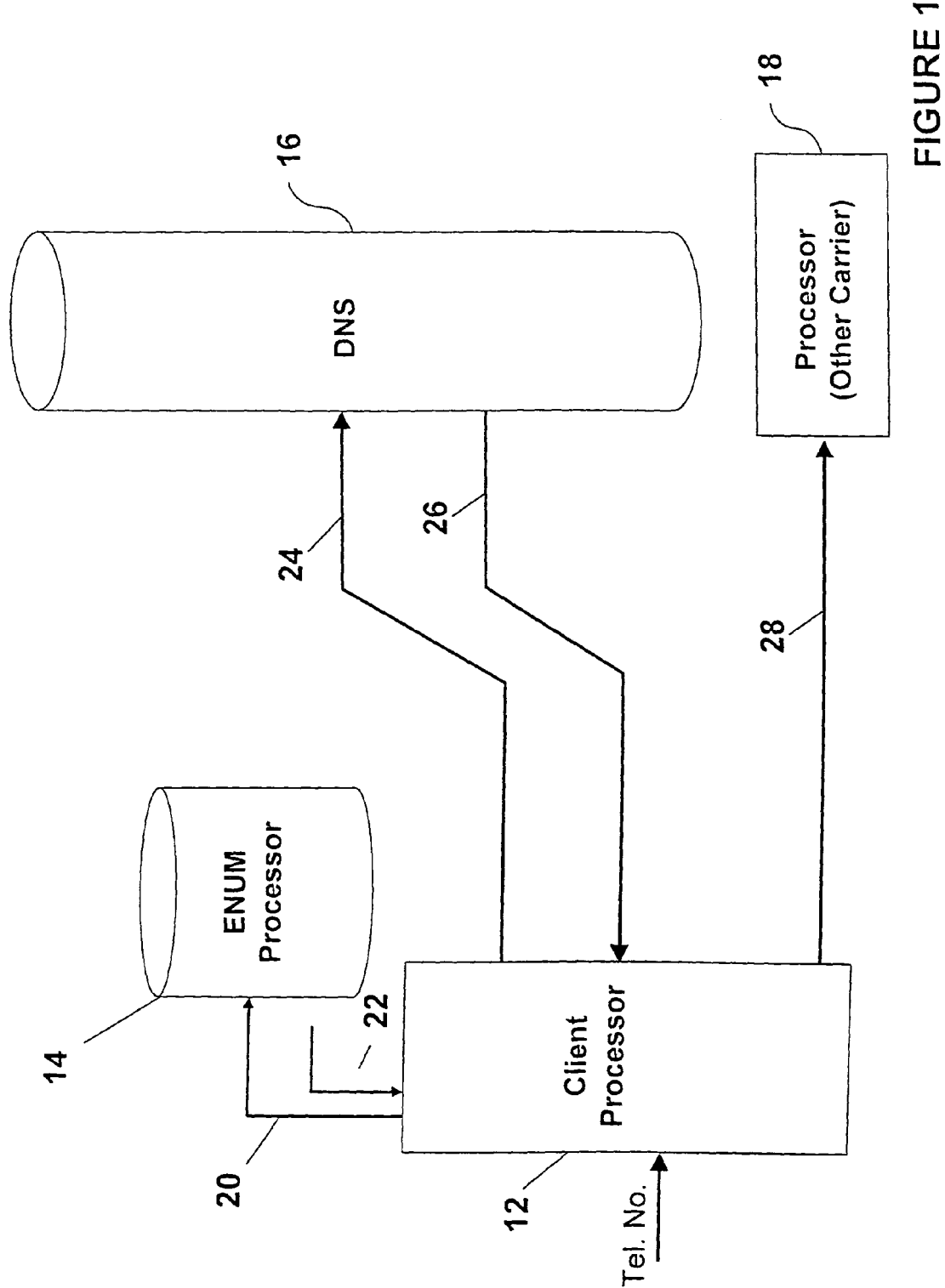
FIG. 1 is an illustration of an exemplary system for resolving IP address associated with a telephone number.

FIG. 1 is an illustration of an exemplary system for resolving IP address associated with a telephone number. ENUM allows a user to obtain a list of IP addresses associated with a telephone number. For example, a user can type a telephone number into a portable phone and access a listing of Internet Protocol resources (URI) for that number, such as addresses for IP telephony, e-mail, web sites, or a combination thereof. It is emphasized that the FIG. 1 is exemplary and not intended to imply a specific implementation. Client processor 12 can comprise any appropriate processor capable of receiving, or generating, a telephone number and communicating with ENUM processor 14. The client processor 12 can be implemented in a single processor, such as a computer, or multiple processors. Multiple processors can be distributed or centrally located. Multiple processors can communicate wirelessly, via hard wire, or a combination thereof. For example, each portion of the client processor 12 can be implemented via multiple distributed processors. Processors can include databases.

ENUM processor 14 comprises an association of telephone numbers and Uniform Resource Identifiers (URIs). Each URI contains a domain name. The ENUM processor 14 can be any appropriate processor capable of associating a telephone number with a URI. The ENUM processor 12 can be implemented in a single processor, such as a computer, or multiple processors. Multiple processors can be distributed or centrally located. Multiple processors can communicate wirelessly, via hard wire, or a combination thereof. For example, each portion of the ENUM processor 14 can be implemented via multiple distributed processors. Processors can include databases.

DNS 16 represent the Domain Name System (DNS). The DNS is known in the art. When a user of the Internet today searches for a web site, he or she specifies a symbolic name such as "www.domain.name.com." Processors, however, do not understand these symbolic names. Thus, the DNS has been established to convert symbolic names to processor understandable logical names, e.g., an IP address. The DNS maps symbolic names to logical names. The DNS 16 can be implemented in a single processor, such as a computer, or multiple processors. Multiple processors can be distributed or centrally located. For example, the DNS processor that knows the IP address for which the client is searching can be located in the network of the target carrier. Multiple processors can communicate wirelessly, via hard wire, or a combination thereof. For example, each portion of the DNS 16 can be implemented via multiple distributed processors. Processors can include databases.

As explained in more detail below, processor 18 represents a server in a network, or operated by a carrier, other than the network or carrier of the client processor 12.

A telephone number is provided to the client processor 12. The telephone number can be provided by any appropriate means. For example, the telephone number can be provided via a portable phone, a processor, a laptop computer, a personal digital assistant (PDA), an Internet browser, a wireless link, a wired link, or a combination thereof. In an exemplary embodiment, the client processor 12 comprises one of the above mentioned examples of telephone number provider (e.g., the client processor 12 can comprise a portable phone), and thus generates the telephone number. The telephone number is formatted by the client processor 12. The client processor 12 provides the formatted telephone number to the ENUM processor 14, as indicated by arrow 20. The ENUM processor responds to the client processor with the ENUM record, as depicted by arrow 22.

Figure 2:
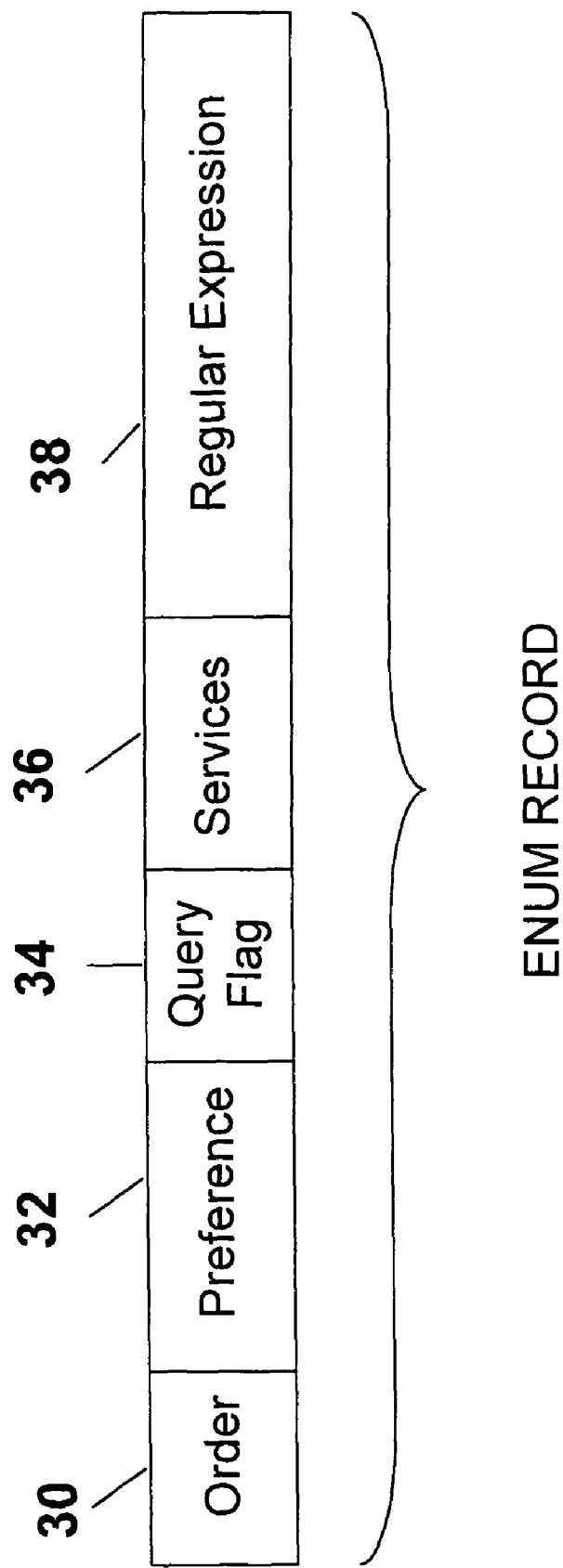
FIG. 2 is an illustration of exemplary portions of an ENUM record.

FIG. 2 is an illustration of exemplary portions of an ENUM record comprising order portion 30, preference portion 32, query flag portion 34, services portion 36, regular expression portion 38, and replacement portion 24. The order portion 30 comprises a character string indicative of the order in which the records must be processed. The preference portion 32 comprises a character string indicative the order in which records with equal order should be processed. The query flag portion 34 comprises a character string indicative of a type of query to be performed. In an exemplary embodiment, the query flag portion 34 comprises at least one query flag indicative of a query type to be initiated against the DNS. The services portion 36 comprises a character string indicative of application specific parameters. The regular expression portion 38 comprises a character string indicative of the next domain name to be looked up. This character string also can be, but does not have to be, indicative of the telephone number.

Referring again to FIG. 1, the client processor 12 initiates a query (arrow 24) against the DNS 16, in accordance with the ENUM record received from the ENUM processor 14. The DNS 16 is queried according to the query flag contained in the ENUM record. The query flag indicates the type of query to initiate. For example, the query flag can indicate that the DNS 16 should be queried for mail exchange resource records or that the DNS 16 should be queried for server resource records. The DNS 16 responds (arrow 26) to the query with the appropriate server or mail exchange resource records. If it is authoritative for the domain name(s) contained therein, the responding DNS server also can include the appropriate IP address(es) in its response. Otherwise, a final DNS query is necessary to resolve to an IP address.

In an exemplary embodiment, a query flag having a value of "g" (case insensitive) is indicative of a query for server resource records, and a query flag having a value of "m" (case insensitive) is indicative of a query for mail exchange resource records. FIG. 3 is an illustration of portions of ENUM records showing exemplary ENUM flags "g" and "m". The query flag "g"; indicates that the domain name contained in the regular expression portion is one for which server resource records exist, thus, a query for server resource records should be initiated. After receiving the ENUM record containing the "g" query flag, the DNS is queried for server resource records. That is, the signaling flow proceeds directly to a query for server resource records, and intermediate steps for locating server resource records are bypassed. The query flag "m"; indicates that the domain name contained in the regular expression portion is one for which mail exchange resource records exist, thus, a query for mail exchange resource records should be initiated. After receiving the ENUM record containing the "m" query flag, the DNS is queried for mail exchange resource records.

Figure 4:
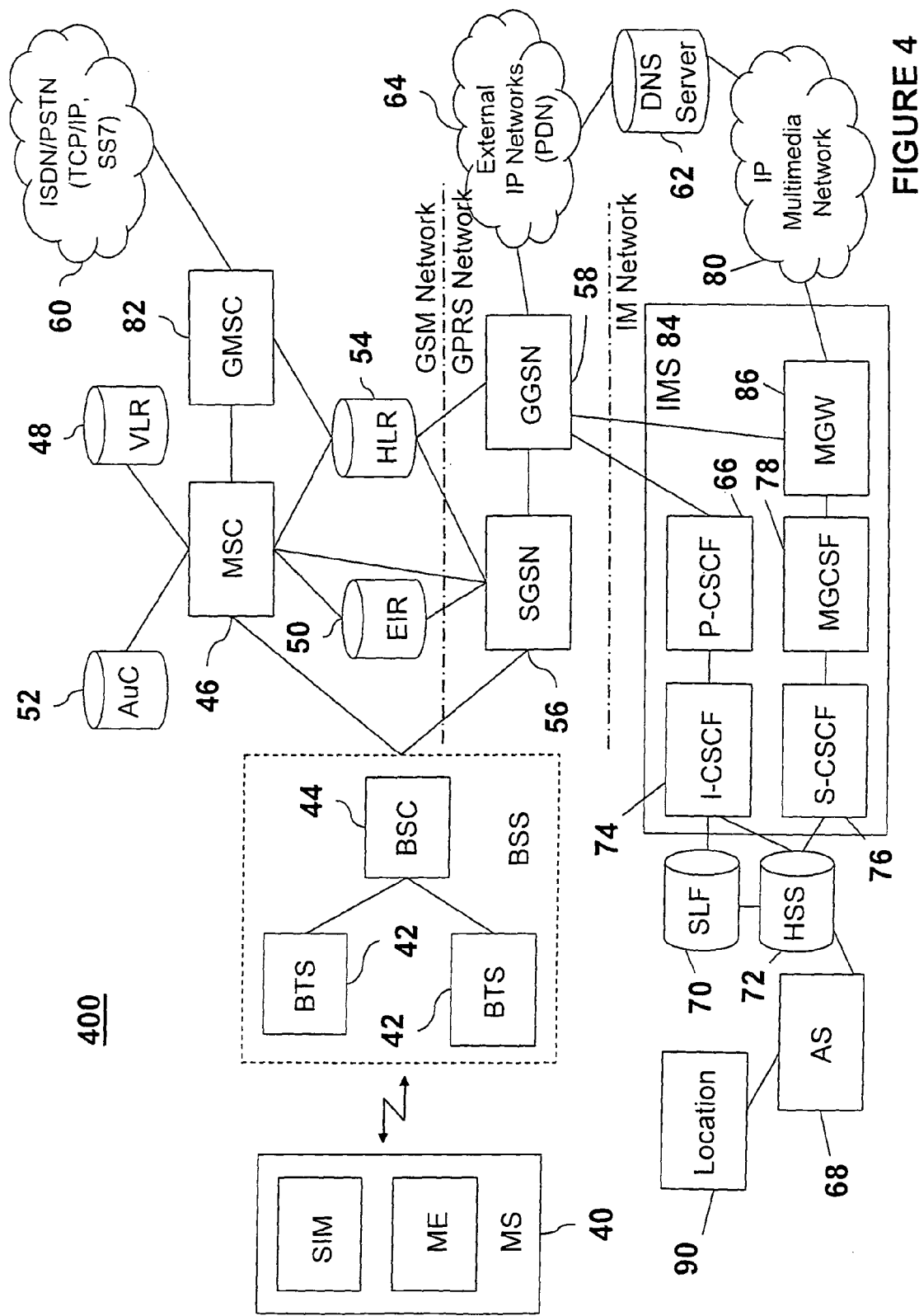
FIG. 4 is an illustration of an exemplary network architecture for resolving IP addresses associated with a telephone number in a wireless communications network.

FIG. 4 is an illustration of an exemplary network architecture 400 for resolving IP addresses associated with a telephone number in a wireless communications network, including a global system for mobile communication (GSM) network, a general packet radio service (GPRS) network, an IP Multimedia network. The GSM provides circuit switched data services to subscribers, such as mobile telephone or computer users. The GPRS provides packet switching to GSM networks. The exemplary network architecture 300 includes a GSM core network and a GPRS network. The exemplary GSM core network comprises a mobile stations (MS) 40, at least one base transceiver station (BTS) 42, and a base station controller (BSC) 44. The MS 40 comprises physical equipment or mobile equipment (ME), such as a mobile phone or a laptop computer that is used by mobile subscribers, with a subscriber identify module (SIM). The SIM includes an international mobile subscriber identity (IMSI), which is a unique identifier of a subscriber. The BTS 42 comprises physical equipment, such as a radio tower, that enables a radio interface to communicate with the MS 40. Each BTS 42 can server more than one MS 40. The BSC 44 manages radio resources, including the BTS 42. The BSC 44 can be connected to several BTSs. The BSC 44 and the BTSs 42, generally are referred to herein as a base station system BSS.

The GSM core network also comprises a mobile switching center (MSC) 46, a gateway mobile switching center (GMSC) 82, a home location register (HLR) 54, a visitor location register (VLR) 48, an authentication center (AuC) 52, and an equipment identity register (EIR) 50. The MSC 46 performs a switching function for the GSM network. The MSC 46 also performs other functions, such as registration, authentication, location updating, handovers, and call routing. The GMSC 82 provides a gateway between the GSM network and other networks, such as an integrated services digital network (ISDN) or public switched telephone networks (PSTNs) 60. Thus, the GMSC 82 provides interworking functionality with external networks such as the ISDN and/or the PSTN. An ISDN is a type of circuit switched telephone network system designed to allow digital transmission of voice and data over ordinary telephone copper wires. An ISDN also comprises a set of protocols for establishing and disconnecting circuit switched connections. A PSTN is a conglomeration of circuit switched telephone networks including digital, analog, mobile, and fixed line systems.

The HLR 54 comprises a data base that contains administrative information regarding each subscriber registered in a corresponding GSM network. The HLR 54 also contains the current location of each MS 40. The VLR 48 comprises a data base that contains selected administrative information for the HLR 54. The VLR 48 contains information necessary for call control and provision of subscribed services for each MS 40 currently located in a geographic area controlled by the VLR 48. The HLR 54 and the VLR 48, along with the MSC 46, provide the call routing and roaming capabilities of GSM. The AuC 52 provides the parameters needed for authentication and encryption functions. Such parameters allow verification of a subscriber's identify. The EIR 50 stores security sensitive information about the mobile equipment.

To gain access to GSM services, such as speech, data, and short message service (SMS), the MS 40 registers with the network to indicate its current location b performing a location update and IMSI attach procedure. The MS 40 sends a location update message including its current location information to the MSC 46 NVLR 48, via the BTS 42 and the BSC 44. The location information is then sent to the MS's 40 HLR 54. The HLR 54 is updated with the location information received from the MSC 46/VLR 48. The location update is also performed when the MS moves to a new location area. Typically, the location update is periodically performed to update the database as location updating events occur.

The GPRS network is logically integrated with the GSM core network architecture via two packet switching network nodes: a serving GPRS support node (SGSN) 56 and a gateway GPRS support node (GGSN) 58. The SGSN 56 is at the same hierarchical level as the MSC 46 in the GSM network. The SGSN 56 controls the connection between the GPRS network and the MS 40. The SGSN 56 also keeps track of individual MS's locations and manages security functions and access controls. The GGSN 58 provides a gateway between the GPRS network and a public packet data network (PDN) or other GPRS networks 64. A PDN is a network established and operated by a telecommunications administration, or a recognized private operating agency, for the specific purpose of providing data transmission service for the public. Thus, the GGSN 58 provides interworking functionality with external packet data networks, and sets up a logical link to the MS 40 through the SGSN 56. When packet switched data leaves the GPRS network, it is transferred to an external TCP-IP network 64, such as an X.25 network or the Internet. To access GPRS services, the MS 40 first attaches itself to the GPRS network by performing an attach procedure. The MS 40 then activates a packet data protocol (PDP) context, thus activating a packet communication session between the MS 40, the SGSN 56, and the GGSN 58.

The IP multimedia network was introduced with 3GPP Release 5, and includes an IP multimedia subsystem (IMS) 84 to provide multimedia services to end users. A representative set of the network entities within the IMS 84 are a call/session control function (CSCF), a media gateway control function (MGCF) 78, a media gateway (MGW) 66, and a master subscriber database, called a home subscriber server (HSS) 72. The HSS 72 can be common to the GSM network, the GPRS network, as well as the IP multimedia network.

The IP multimedia subsystem 84 is built around the call/session control function, of which there are three types: an interrogating CSCF (I-CSCF) 74, a proxy CSCF (P-CSCF) 66, and a serving CSCF (S-CSCF) 76. The P-CSCF 74 is the MS's first point of contact with the IMS 84. The P-CSCF 66 forwards session initiation protocol (SIP) messages received from the MS to an SIP server in a home network (and vice versa) of the MS. The P-CSCF 66 can also modify an outgoing request according to a set of rules defined by the network operator (for example, address analysis and potential modification).

The I-CSCF 74, forms an entrance to a home network and hides the inner topology of the home network from other networks and provides flexibility for selecting an S-CSCF. The I-CSCF 74 can contact a subscriber location function (SLF) 70 to determine which HSS 72 to use for the particular subscriber, if multiple HSS's 72 are present. The S-CSCF 76 performs the session control services for the MS 102. This includes routing originating sessions to external networks and routing terminating sessions to visited networks. The S-CSCF 76 also decides whether an application server (AS) 68 is required to receive information on an incoming SIP session request to ensure appropriate service handling. This decision is based on information received from the HSS 72 (or other sources, such as an application server 68). The AS 68 also communicates to a location server 90 (e.g., a Gateway Mobile Location Center (GMLC)) that provides a position (e.g., latitude/longitude coordinates) of the MS 40.

The HSS 72 contains a subscriber profile and keeps track of which core network node is currently handling the subscriber. It also supports subscriber authentication and authorization functions (AAA). In networks with more than one HSS 72, a subscriber location function provides information on the HSS 72 that contains the profile of a given subscriber.

The MGCF 78 provides interworking functionality between SIP session control signaling from the IMS 84 and ISUP/BICC call control signaling from the external GSTN networks (not shown). It also controls the media gateway (MGW) 86 that provides user-plane interworking functionality (e.g., converting between AMR- and PCM-coded voice). The MGW 86 also communicates with other IP multimedia networks 80.

In an exemplary embodiment, a telephone number can be provided by a mobile station (e.g., MS 40 of FIG. 4). The client processor 12 of FIG. 2 can be implemented as the S-CSCF 76. The DNS 16 of FIG. 2 can be implemented as part of the DNS server 62 of FIG. 4, which can be implemented on a public or private basis. The ENUM processor 14 of FIG. 2 can be implemented as a special-purpose DNS server within a carrier's network, on a private basis outside the carriers' networks, or within the public DNS hierarchy residing at e164.arpa.

Figure 5:
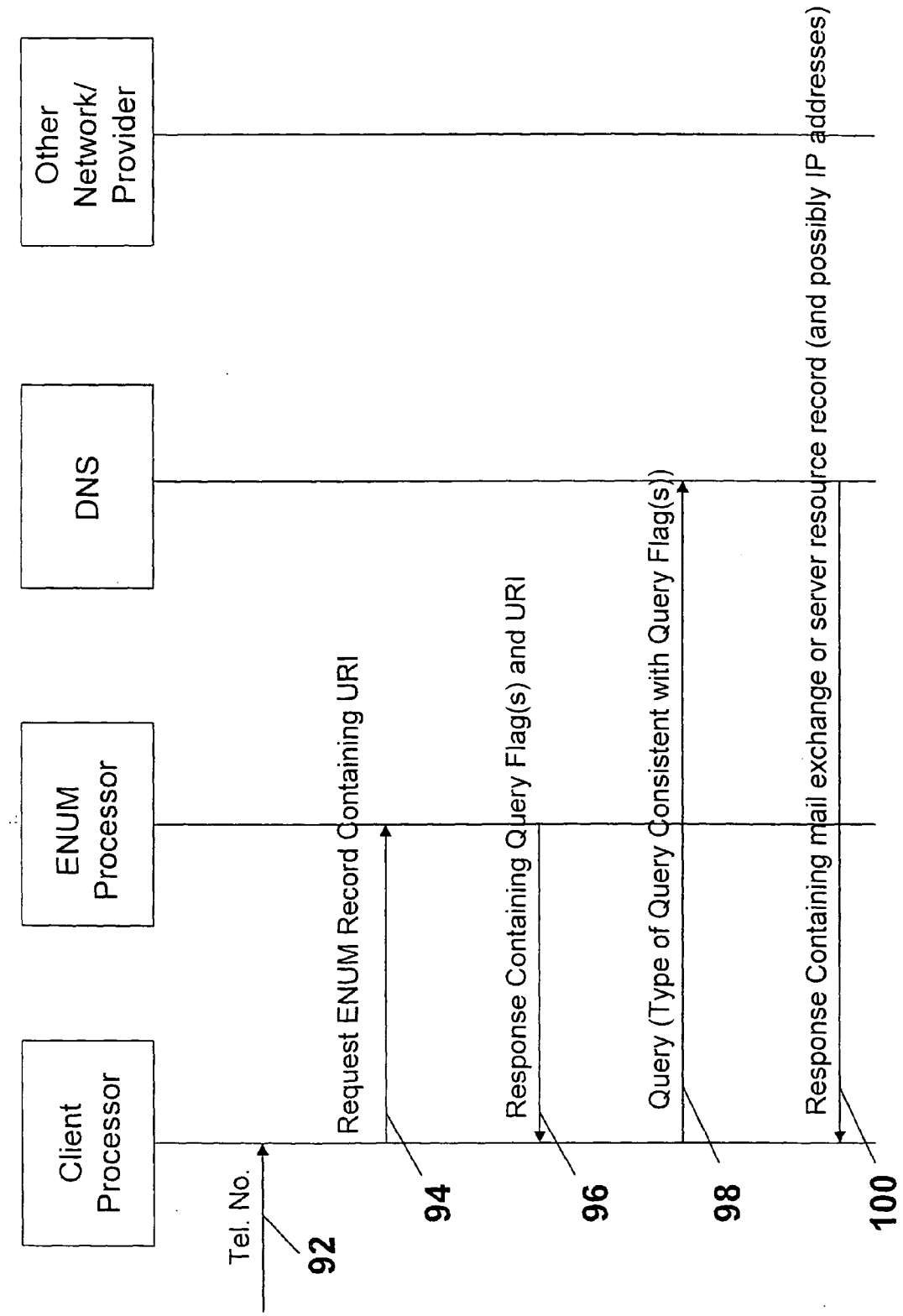
FIG. 5 is a sequential flow diagram of an exemplary sequence of events for resolving an IP address associated with a telephone number.

FIG. 5 is a sequential flow diagram of an exemplary sequence of events for resolving an IP address associated with a telephone number. A telephone number is received by the client processor at step 92. The client processor, which could be a S-CSCF, formats the telephone number and sends a request for a domain name (or domain names), which can be part of a URI, to the ENUM processor at step 94. Note, it is possible to receive multiple URIs in response to an ENUM query. The multiple URIs are returned in separate ENUM records, each of which contains one URI. Each URI in turn contains a domain name. The ENUM processor creates an ENUM record containing at least one query flag. Each query flag is indicative of the type of search to be initialized against the DNS. The ENUM processor sends a response containing the ENUM record (which in turn includes a URI) to the client processor at step 96. At step 98, the client processor initiates a query against the DNS utilizing the query flags of the ENUM record. The DNS responds to the client processor with the appropriate IP addresses at step 100.

Figure 6:
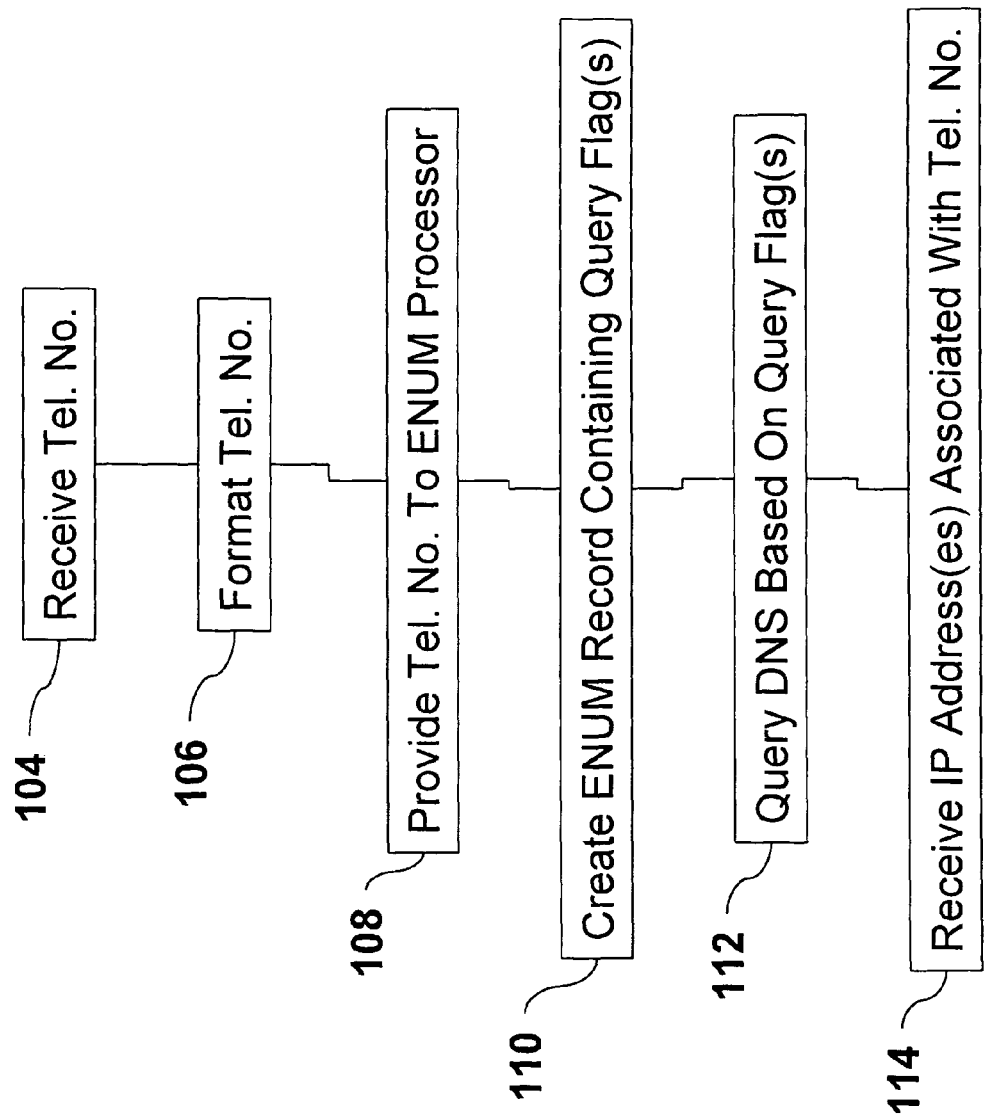
FIG. 6 is a flow diagram of an exemplary process for resolving an IP address associated with a telephone number.

FIG. 6 is a flow diagram of an exemplary process for resolving an IP address associated with a telephone number. A telephone number is received at step 104. The telephone number is formatted at step 106. The telephone number is formatted to be compatible with any appropriate protocol. The formatted telephone number is provided to the ENUM processor at step 108. At step 110, the ENUM processor creates an ENUM record. The ENUM record comprises at least one query flag. Each query flag is indicative of a type of query to be initiated against the DNS. The DNS is queried utilizing the query flags of the ENUM record at step 112. IP addresses associated with the telephone number are provided by the DNS (received by the client processor) at step 114.

In the case in which a server in another network is utilized (e.g., processor 18 of FIG. 1), the IP addresses received by the client processor is indirectly associated with the telephone number. In this case, the IP address received by the client processor is the IP address of the out of network processor (e.g., processor 18 of FIG. 1). The out of network processor functions as an intermediary. As used herein, a statement that an IP address is associated with a telephone number comprised both direct and indirect associations.

As described herein, query flags for incorporation into the ENUM record, provide an explicit indication as to the type of query to be performed against the DNS. The use of query flags provides an explicit indication as to how the domain name portion of a URI in an ENUM record should be interpreted. Query flags also provide guidance to the client processor as to subsequent actions to be performed. The use of query flags eliminates ambiguities associated with making assumptions about the domain name contained in an ENUM record. Resolving ambiguities mitigates interoperability problems arising from different service providers interpreting domain names differently. For SIP-based services, the use of query flags allows a more efficient signaling flow than the signaling flow described in the RFC 3263. Thus, the use of query flags as described herein can reduce latency, reduce the load on transmission links, and reduce processing load on network elements.

The various techniques described herein can be implemented in connection with hardware or software or, where appropriate, with a combination of both. Thus, the methods and apparatus for resolving an IP address associated with a telephone number, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatuses for resolving an IP address associated with a telephone number also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of resolving an IP address associated with a telephone number. Additionally, any storage techniques used in connection with resolving an IP address associated with a telephone number can invariably be a combination of hardware and software.

Processors for resolving an IP address associated with a telephone number also can contain communications connections that allow the processor to communicate with other processors and/or devices. Communications connections are an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both storage media and communication media.

While methods, apparatuses, and systems for resolving an IP address associated with a telephone number have been described in connection with exemplary embodiments of the various figures, it is to be understood that other similar embodiments can be used or modifications and additions can be made to the described embodiments for performing the same function of resolving an IP address associated with a telephone number without deviating therefrom. Therefore, methods, apparatuses, and systems for resolving an IP address associated with a telephone number should not be limited to any single embodiment, but rather should be construed in breadth and scope in accordance with the appended claims.

What is claimed:

1. A method for obtaining an Internet Protocol (IP) address associated with a telephone number, said method comprising:
    creating an Electronic Number (ENUM) record comprising:
        a first portion indicative of said telephone number;
        a second portion indicative of a domain name associated with said telephone number; and
        a query flag indicative of a respective query type to be initiated against a domain name system (DNS), the query type including a query for mail exchange resource records, and a query flag indicative of initiating the query for mail exchange resource records being unique to the query for mail exchange resource records as compared to a query flag indicative of another respective query type; and
    querying said DNS with said ENUM record to obtain at least one IP address associated with said telephone number.

2. The method of claim 1, wherein said query type to be initiated further includes
    a query for server resource records.

3. The method of claim 1, wherein:
    the query flag indicative of initiating the query for mail exchange resource records having a value of "m"; and
    a query flag having a value of "g" is indicative of initiating a query for server resource records.

4. The method of claim 1, further comprising:
    obtaining said at least one IP address via a wireless communications network.

5. A system for obtaining an Internet Protocol (IP) address associated with a telephone number, said system comprising:
    a first processor for:
        receiving said telephone number;
        creating a query for a domain name associated with said telephone number,
        wherein said query comprises an indication of said telephone number; and
        providing said query to a second processor;
    said second processor for:
        creating an Electronic Number (ENUM) record in response to receiving said query, said ENUM record comprising:
            a first portion indicative of said telephone number;
            a second portion indicative of a domain name associated with said telephone number; and
            a query flag indicative of a respective query type to be initiated against a domain name system (DNS), the query type including a query for mail exchange resource records, and a query flag indicative of initiating the query for mail exchange resource records being unique to the query for mail exchange resource records as compared to a query flag indicative of another respective query type.

6. The system of claim 5, wherein said query type to be initiated further includes
    a query for server resource records.

7. The system of claim 5, wherein:
    the query flag indicative of initiating the query for mail exchange resource records having a value of "m"; and
    a query flag having a value of "g" is indicative of initiating a query for server resource records.

8. The system of claim 5, wherein said system is part of a wireless communications network.

9. A computer-readable tangible storage medium having computer-executable instructions stored thereon, the instructions when executed by a computer causing the computer to implement a method to create a data structure, said method comprising:

creating an Electronic Number (ENUM) record comprising:

a first portion indicative of said telephone number;

a second portion indicative of a domain name associated with said telephone number; and a query flag indicative of a respective query type to be initiated against a domain name system (DNS), the query type including a query for mail exchange resource records, and a query flag indicative of initiating the query for mail exchange resource records being unique to the query for mail exchange resource records as compared to a query flag indicative of another respective query type.

10. The computer-readable tangible storage medium of claim 9, wherein said query type to be initiated further includes a query for server resource records.

11. The computer-readable tangible storage medium of claim 9, wherein:

the query flag indicative of initiating the query for mail exchange resource records having a value of "m"; and a query flag having a value of "g" is indicative of initiating a query for server resource records.

12. The computer-readable tangible storage medium of claim 9, the method further including:

creating said ENUM record; and querying said DNS with said ENUM record to obtain at least one IP address associated with said telephone number.

13. The computer-readable tangible storage medium of claim 12, the method further including obtaining said at least one IP address via a wireless communications network.

\* \* \* \* \*